July 21, 1959    H. C. JACOBSON ET AL    2,895,721
AUXILIARY MIXING DEVICE
Filed May 6, 1957    2 Sheets-Sheet 1
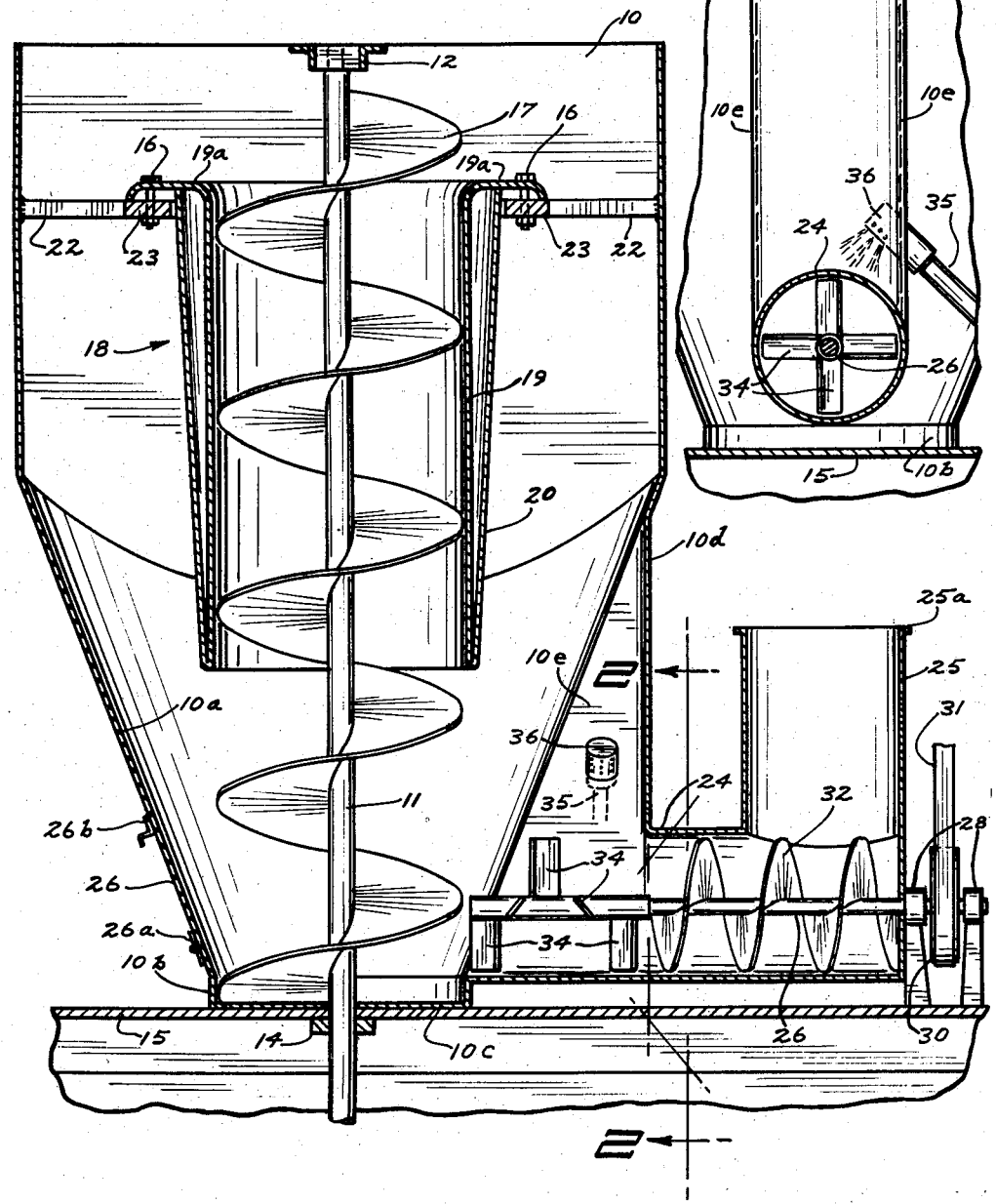
INVENTORS
HOWARD C. JACOBSON
ROBERT C. OLSON
Reif and Gregory
ATTORNEYS

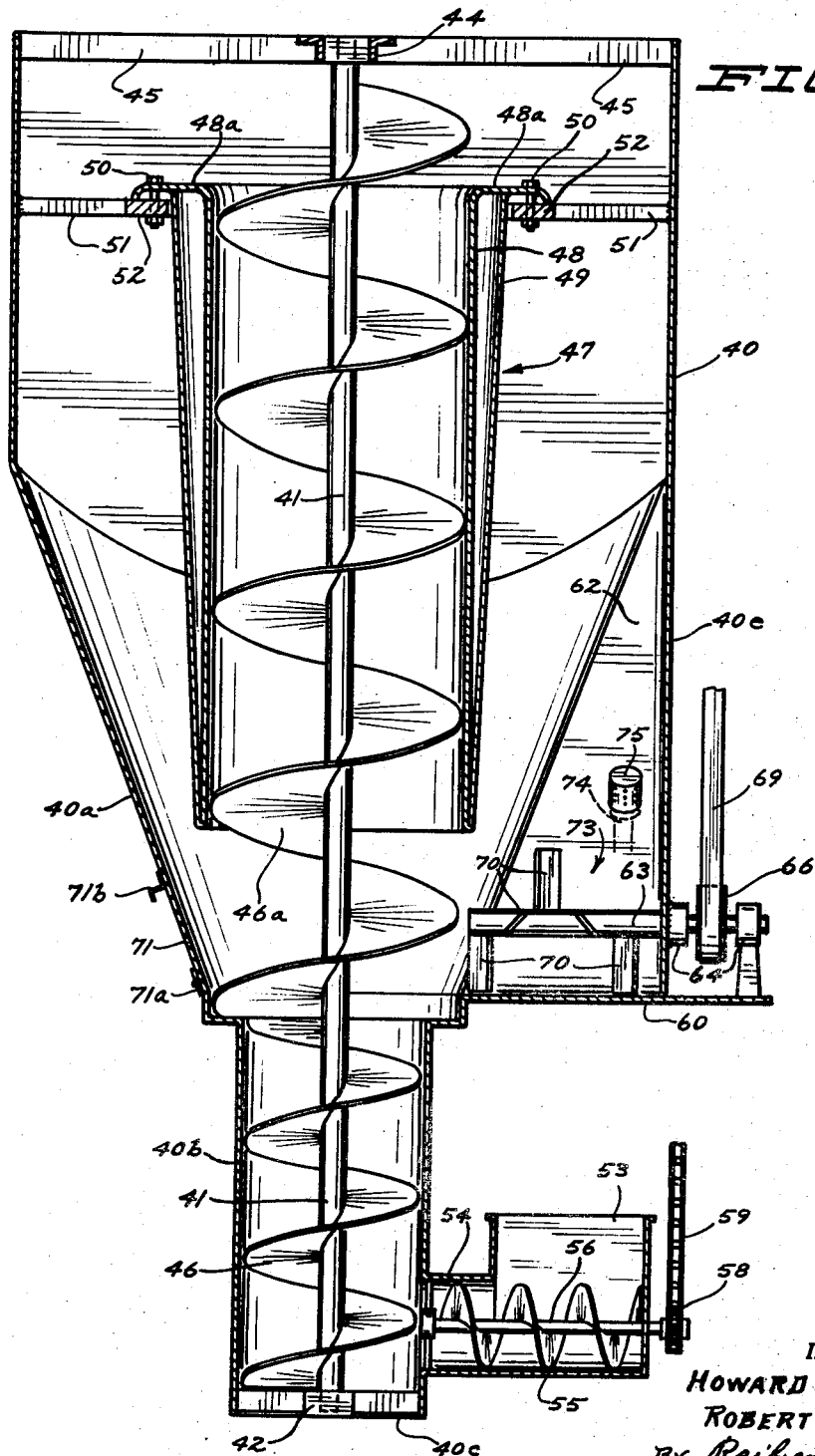

United States Patent Office 2,895,721
Patented July 21, 1959

2,895,721
AUXILIARY MIXING DEVICE

Howard C. Jacobson and Robert P. Olson, Minneapolis, Minn.

Application May 6, 1957, Serial No. 657,103

3 Claims. (Cl. 259—23)

This invention relates to a mixing device of a type now commonly used for mixing various cattle and animal feeds, the materials mixed preferably including a liquid, such as molasses. One well known form of mixer comprises a tank having a lower downwardly tapering portion in which is disposed substantially centrally thereof a conveyor, preferably of the screw or helical type, for moving the material upwardly through a vertical tubular casing closely surrounding the said conveyor. The material is moved upwardly by said conveyor over the top of said casing and then falls to the bottom of said tank to be again moved upwardly by said conveyor. This movement of the material mixes the same.

It is an object of this invention to provide a mixer of the general type above described with an auxiliary mixing device which mixes the dry material or dry material delivered with a liquid if desired before the same is elevated by said central conveyor.

It is a further object of the invention to provide such an auxiliary mixing device comprising a conveyor receiving material from an inlet means and moving the same towards said tank and a mixing and conveying member comprising a plurality of longitudinally spaced radially extending blades.

It is still another object of the invention to provide such a device as set forth in the preceding paragraph in which the downwardly tapering portion of the tank above referred to has a substantially vertical side portion at which said conveyor and mixing and conveying member is disposed, said member being disposed within said tank at said portion.

It is also an object of the invention to provide such a device as set forth in the preceding paragraph save one in which the inner end of said conveying and mixing member is disposed closely adjacent to the central conveyor in the tank which moves the material upwardly.

It is still another object of the invention to provide an auxiliary mixing device for a feed mixer comprising a tank with a downwardly tapering lower portion and a central conveyor preferably of the helical type disposed therein and acting to move and mix material to be mixed.

These and other objects and advantages of the invention will be fully set forth in the following description made in connection with the accompanying drawings in which like reference characters refer to similar parts throughout the several views and in which:

Fig. 1 is a central vertical section through the device, a portion thereof being shown in side elevation;

Fig. 2 is a partial vertical section taken on line 2—2 of Fig. 1, as indicated by the arrows; and Fig. 3 is a view in vertical section taken diametrically of the device and showing a modification of applicants' mixing device.

Referring to the drawings, especially Figs. 1 and 2, a mixing device is shown comprising a tank 10. Tank 10 is made of strong sheet material, the same being cylindrical at its upper end and having a downwardly tapering portion 10a extending to a short cylindrical portion 10b having a bottom 10c. A shaft 11 is disposed centrally of tank 10, the same being journaled in bearings 12 and 14 at the top and bottom of said tank respectively. Bearing 14 is shown as carried on a base member 15 which supports the device. A conveyor 17 of the screw or helical type is carried by shaft 11. A suitable driving means, not shown, will be provided for shaft 11, which driving means will be disposed below the supporting plate 15. A casing 18 surrounds a portion of conveyor 17, the same having an inner diameter slightly greater than the diameter of conveyor 17. Said casing is here illustrated as having a double wall structure comprising an inner wall 19 forming a substantially cylindrical inner portion and an outer wall 20 inclined upwardly and outwardly about said inner wall and extending to the same height. An annular lip or flange 19a extends outwardly of said inner wall substantially horizontally overlying said outer wall. Said outer wall will be secured to the underside of said flange, as by welding. Said casing is removably supported in suspended position by a frame formed by spaced parallel frame members 22 extending across the upper portion of said tank 10 and parallel spaced members 23 extending transversely between said members 22 centrally thereof. The ends of members 22 will be secured, as by welding, to the inner side of said tank and said members 23 will be secured to said members 22 as by welding. Said flange 19a will be removably secured to said frame portion, as by metal screws 16.

In accordance with the present invention, casing 10 at one side has a vertically disposed wall portion 10d from which parallel portions 10e extend to the conical wall of portion 10a. A cylindrical portion 24 extends outwardly from the wall 10d. Said cylindrical portion is illustrated as being in a horizontal position, but if desired it may be inclined upwardly as it extends outwardly. A conduit 25 extends upwardly from portion 24, as shown in Fig. 1. Conduit 25 is open at its upper end and forms an inlet means to receive the dry material to be mixed. Conduit 25 is shown as having a narrow projecting flange 25a at its upper end. A shaft 26 is journaled in a pair of spaced bearings 28, said bearings being supported on the plate 15. A pulley 30 is secured to shaft 26 over which runs a belt 31 which will also run over another driving pulley. Shaft 26 extends toward and into the tank 10. A conveyor 32 which in the embodiment of the invention here illustrated is shown to be of the helical type is secured to shaft 26 and the same acts to move the material entering conduit 25 toward tank 10. Also secured to shaft 26 are a plurality of blades 34, said blades being longitudinally spaced on shaft 26 and here shown to be helically arranged. The blades are set at an angle to the axis of shaft 26. Shaft 26 and the innermost blade 34 are disposed in close proximity to the outer edge of conveyor 17. Shaft 26 with the blades 34 forms a conveying and mixing member. A conduit 35 is provided available for use, the same having secured to its end a distributing nozzle 36. A liquid, such as molasses, may be delivered through conduit 35.

A discharge outlet is provided adjacent the base portion of said tank 10 preferably at a point opposite said conduit 24 as shown. Said outlet which may take various forms is here shown comprising a door 26 pivoted at its lower end to said tank by a hinge 26a and having at its upper end a spring actuated latch 26b of a commonly used type.

In operation, the dry material to be fed, which may be ground grain or cut up silage, is delivered into conduit 25 and is moved by conveyor 32 toward tank 10. Molasses is indicated here as being delivered through the head 26 toward the conveying and mixing member including blades 34. The molasses and dry material will be mixed by the said member and the same will then be moved inwardly to the conveyor 17. The material will be moved upwardly by the conveyor 17 through casing 18 and will spill out over the top of casing 18, over the flange 19a and dropped to the bottom of tank 10 where it will be again engaged and moved upwardly by conveyor 17, and some of the material will drop onto the member comprising blades 34 and will be mixed with the incoming material also being mixed by the blades 34. It will thus be seen that the material is given a preliminary mixing by blades 34 before it reaches the conveyor 17 and that some of the falling material from casing 18 will also be mixed with the incoming material by the blades 34. Hence blades 34 act as an auxiliary mixer. It has been found in practice that the combination of the auxiliary mixing device, which includes shaft 26, conveyor 32 and blades 34, gives a much improved mixing of the material than when only the conveyor 17 is used. Shaft 26 will be rotated at comparatively high speed and this adds to the efficiency of the mixing.

In Fig. 3 a modified form of mixer is shown to which an auxiliary mixing device is applied. Said mixer shown in Fig. 3 includes a tank 40 having a downwardly tapering lower portion 40a from which extends downwardly a cylindrical portion 40b having a bottom 40c. In the embodiment of the invention here illustrated, said portion 40b is illustrated having a lesser diameter than the bottom of said portion 40a. A shaft 41 extends centrally of tank 40 and portions 40a and 40b, the same being journaled at its bottom in a bearing 42 supported on bottom 40c. Shaft 41 at its top is journaled in a bearing 44 secured to bars 45 which are secured at their outer ends to the inner side of tank 40. Shaft 41 has secured thereto a conveyor 46 shown as of the screw or helical type. The portion of said conveyor 46a above said bottom portion 40b is here illustrated as being increased in diameter. Said conveyor may be of a uniform diameter.

A casing 47 surrounds a part of the upper portion 46a of said conveyor 46. Said casing 47 is here illustrated as being identical in structure to said casing 18 and comprising an inner wall 48, an upwardly inclined outer wall 49, and a flange 48a extending outwardly of said inner wall and overlying said outer wall. Spaced parallel cross members 51 extend across the upper portion of said tank 40 having their inner ends secured to the inner side of said tank. Extending transversely centrally between said members 51 are parallel spaced supporting members 52 whereby a frame is formed adapted to support said casing 47 in suspended position by having said flange 48a resting thereon. Said flange will be removably secured by metal screws 50.

A conduit 53 is disposed at one side of portion 40b at its lower end from which a cylindrical portion 54 extends to portion 40b. A conveyor 55 illustrated as of the screw or helical type is shown at the bottom of members 53 and 54, the same comprising a shaft 56 which extends to the outer side of conduit 53 and is provided with a sprocket 58 over which runs a chain 59 which will be driven by another driven sprocket. If desired, portion 40b and the conduits connected therewith may be positioned below the floor level of the room or area in which said tank 40 is situated.

A portion 40e of the wall of the conical portion 40a is extended vertically downward from the upper portion of member 40 to a horizontal plate 60. Parallel portions 62 extend inwardly from the wall portion 40e, the same converging in semi-cylindrical form to the plate 60 substantially as shown for portion 10e in Figs. 1 and 2. A shaft 63 is journaled in bearings 64, one of which is secured to the outer side of portion 40e and the other of which is supported on an extension of plate 60. A pulley 66 is secured to shaft 63 between bearings 64 over which runs a belt 69. Belt 69 will run over another driven pulley not shown. Shaft 63 extends inwardly to a point in close proximity to the outer edge of conveyor 46. Shaft 63 will have secured thereto an auxiliary mixing and conveying means which may take various forms but which in the embodiment of the invention here illustrated a shown as comprising a plurality of longitudinally space and helically arranged blades 70. Shaft 63 and blades 7 form a conveying and mixing member 73. A conduit 7 extends through the wall of tank 40 and is provided wi a discharge head 75 disposed over member 73 throug which a liquid may be dispensed for mixing with d feed.

A discharge outlet is provided adjacent the base portic of said tank 40 preferably at a point opposite said sha 63 as shown. Said outlet which may take various forn is here shown comprising a door 71 pivoted at its low end to said tank by hinge 71a and having at its upper er a spring actuated latch 71b of a commonly used type.

In operation, the dry material to be mixed is delivere into conduit 53 and is moved by the conveyor 55 into t casing 40b. The material is elevated by conveyor 46 ar moves upwardly through casing 40b, casing portion 4( and through casing 47. The material spills over the tc of casing 47 and drops down onto the blades 70 and sha 63 and the material will be mixed by said blades wi the liquid, such as molasses, delivered through conduit 7 and head 75. Member 73 also acts to move the materi inwardly so that the same will be again carried up l the conveyor 46. Shaft 63 will be driven at comparativ ly high speed.

From the above description it will be seen that appl cants have provided a novel, useful and highly efficie mixing device for the type of mixer above described. Tl high speed conveying and mixing member efficiently mix the material and particularly with a liquid such as m lasses, and the material can then again be moved by tl central conveyor and will eventually be distribut throughout the whole body of material. The mixed m terial is discharged at one side of tanks 10 and 40 illustrated.

The apparatus has been actually made and the san is now being sold commercially. The same has prov very successful and efficient in actual use.

It will of course be understood that various chang may be made in the form, details, arrangement and pr portions of the parts, without departing from the scope applicants' invention, which, generally stated, consists an apparatus capable of carrying out the objects abo set forth, in the parts and combinations of parts di closed and defined in the appended claims.

What is claimed is:

1. A mixing device for feed material having in comt nation, a tank having a lower frusto conical portion, vertically disposed wall portion at one side of said frus conical portion, said wall portion having parallel sid extending to said frusto conical portion thus forming chamber, a conveyor disposed in said tank adapted move material upwardly, a casing removably suspend in said tank closely about a substantial portion of sa conveyor, an auxiliary mixing means disposed in sa chamber for moving material in said chamber towar said conveyor, said material being dropped directly in said chamber by said conveyor over the top of said ca ing, said tank having a lower cylindrical portion depen ing therefrom, said conveyor extending into said low cylindrical portion, inlet means communicating with sa cylindrical portion for receiving material, and rotatab means in said inlet means for moving said material ther through to said conveyor in said cylindrical portion.

2. A mixing device for feed material having in cor bination, a cylindrical tank having a lower frusto conic portion, a side wall portion of said cylindrical portion e tending downwardly, parallel side walls extending fro said downwardly extending wall portion to merge a become integral with said frusto conical portion for su stantially the full height of said frusto conical portion form a chamber opening fully into the chamber of sa frusto conical portion, a cylindrical portion extendi outwardly horizontally from said downwardly extending wall portion and having an upwardly extending cylindrical portion, a horizontal conveyor in said horizontal cylindrical portion communicating with the chamber in said frusto conical portion, a vertical conveyor in said tank for moving material upwardly, said horizontal conveyor extending laterally to said vertical conveyor, a casing removably suspended in said tank enveloping a substantial portion of said vertical conveyor, said material being dropped over said casing by said vertical conveyor into said first mentioned chamber, and means extending into said first mentioned chamber for introducing a liquid to be mixed with said material.

3. The structure set forth in claim 2, said horizontal conveyor comprising an outer screw portion and a inner portion extending into said first chamber having flat angled helically arranged blades for mixing and remixing said material and moving the same laterally into engagement with said vertical conveyor.

References Cited in the file of this patent
UNITED STATES PATENTS

| | | |
|---|---|---|
| 490,611 | Miller | Jan. 24, 1893 |
| 1,721,553 | Haines | July 23, 1929 |
| 1,914,459 | Reider et al. | June 20, 1933 |
| 1,958,939 | Bullock | May 15, 1934 |
| 2,735,661 | Patterson | Feb. 21, 1956 |
| 2,800,238 | Oliver | July 23, 1957 |